(12) United States Patent
Shi

(10) Patent No.: US 12,719,330 B2
(45) Date of Patent: Aug. 25, 2026

(54) MOTOR WITH POSITIONING COMPONENT AND ELECTRICAL PRODUCT THEREOF

(71) Applicant: NIDEC CORPORATION, Kyoto (JP)

(72) Inventor: Wenxian Shi, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 358 days.

(21) Appl. No.: 18/454,822

(22) Filed: Aug. 24, 2023

(65) Prior Publication Data

US 2024/0258874 A1 Aug. 1, 2024

(30) Foreign Application Priority Data

Jan. 31, 2023 (CN) ......................... 202320158581.6

(51) Int. Cl.

*H02K 5/26* (2006.01)
*B62D 5/04* (2006.01)
*F16D 65/14* (2006.01)
*F16D 121/24* (2012.01)

(52) U.S. Cl.

CPC ............. *H02K 5/26* (2013.01); *B62D 5/0403* (2013.01); *F16D 65/14* (2013.01); *F16D 2121/24* (2013.01)

(58) Field of Classification Search

CPC .......... H02K 1/185; H02K 1/18; H02K 1/182; H02K 1/148; H02K 5/04; H02K 5/24; H02K 7/09; H02K 5/26; H02K 5/08; F16C 32/047

USPC .......... 310/91, 90.5, 89, 415, 431–433, 427, 310/216.127, 216.129, 216.114

See application file for complete search history.

(56) References Cited

U.S. PATENT DOCUMENTS 493,337 A * 3/1893 Parshall ................. H02K 15/12 310/265
1,771,475 A * 7/1930 Wright ................... H02K 1/185 310/407
1,795,882 A * 3/1931 Noden ................... H02K 1/185 310/216.049
1,822,096 A * 9/1931 Hollander ............. H02K 1/185 310/426
2,001,799 A * 5/1935 Seyfried ................ H02K 1/185 310/414

(Continued)

FOREIGN PATENT DOCUMENTS

CN 112366879 A * 2/2021 ......... H02K 11/0094

OTHER PUBLICATIONS

CN112366879 English Translation.*

*Primary Examiner* — Maged M Almawri
(74) *Attorney, Agent, or Firm* — JCIPRNET

(57) ABSTRACT

Disclosed are a motor and an electrical product. The motor includes a stator and a housing for accommodating the stator. The housing includes a housing wall and a housing bottom, the stator includes a stator core and a resin component at least covering one side of the stator core facing the housing bottom, and one side of the resin component facing the housing bottom has a concave component. One side of the housing bottom facing the resin component has a positioning component, and the positioning component is axially opposite to the concave component. In this way, the concave component is defined in a part of the resin component of the stator core that is axially opposite to the positioning hole, and the positioning pin is inserted into the positioning hole and the concave component to position the housing and the stator core.

7 Claims, 3 Drawing Sheets

(56) References Cited

U.S. PATENT DOCUMENTS

| | | | | | |
|---|---|---|---|---|---|
| 2,011,060 | A * | 8/1935 | Leland | H02K 1/185 | 310/216.135 |
| 2,023,259 | A * | 12/1935 | Anderson | H02K 1/185 | 310/426 |
| 2,251,674 | A * | 8/1941 | Gillen | H02K 17/10 | 310/216.049 |
| 2,478,316 | A * | 8/1949 | Potter | H02K 1/185 | 310/216.127 |
| 2,523,520 | A * | 9/1950 | Reinhard | H02K 1/185 | 310/410 |
| 2,689,394 | A * | 9/1954 | Heinz | B23C 5/2295 | 407/51 |
| 2,711,492 | A * | 6/1955 | Ballman | H02K 1/185 | 164/109 |
| 2,876,371 | A * | 3/1959 | Wesolowski | H02K 1/16 | 310/216.049 |
| 2,939,021 | A * | 5/1960 | Gilchrist | H02K 1/185 | 310/91 |
| 2,977,491 | A * | 3/1961 | Hueffed | H02K 1/185 | 310/414 |
| 4,227,109 | A * | 10/1980 | Mulach | H02K 1/16 | 310/216.049 |
| 4,286,187 | A * | 8/1981 | Binder | H02K 7/1815 | 310/90 |
| 4,603,273 | A * | 7/1986 | McDonald | H02K 15/16 | 310/90 |
| 4,642,502 | A * | 2/1987 | Carpenter | H02K 1/2781 | 310/216.013 |
| 4,765,054 | A * | 8/1988 | Sauerwein | H02K 3/522 | 310/216.115 |
| 4,797,602 | A * | 1/1989 | West | H02K 1/278 | 310/156.28 |
| 4,972,113 | A * | 11/1990 | Newberg | H02K 15/16 | 310/410 |
| 5,015,904 | A * | 5/1991 | Kleemann | H02K 3/325 | 310/194 |
| 5,319,270 | A * | 6/1994 | Tanaka | H02K 11/21 | 310/216.096 |
| 5,430,338 | A * | 7/1995 | McMillan | H02K 5/15 | 310/91 |
| 5,742,991 | A * | 4/1998 | Kurth | B29C 45/1747 | 425/589 |
| 5,793,136 | A * | 8/1998 | Redzic | H02K 16/02 | 310/112 |
| 5,796,190 | A * | 8/1998 | Takeda | H02K 1/32 | 310/156.31 |
| 5,818,131 | A * | 10/1998 | Zhang | F04D 13/0646 | 310/90.5 |
| 5,821,647 | A * | 10/1998 | Takehara | H02K 7/14 | 310/90 |
| 5,850,679 | A * | 12/1998 | Hoffman | B25B 27/026 | 29/252 |
| 5,949,169 | A * | 9/1999 | Niimi | H02K 23/04 | 310/216.127 |
| 6,040,645 | A * | 3/2000 | Lynch | H02K 23/54 | 310/227 |
| 6,124,567 | A * | 9/2000 | Feldhausen | B23K 9/1006 | 310/52 |
| 6,225,722 | B1 * | 5/2001 | Rupp | H02K 21/22 | 310/91 |
| 6,305,989 | B1 * | 10/2001 | Quadir | H01R 13/533 | 439/685 |
| 6,310,320 | B1 * | 10/2001 | Kraus | B23K 9/1075 | 219/133 |
| 6,317,963 | B1 * | 11/2001 | Powers | H02K 15/14 | 310/58 |
| 6,320,287 | B1 * | 11/2001 | Watson | H02K 1/185 | 310/91 |
| 6,346,760 | B1 * | 2/2002 | Boardman, IV | H02K 1/16 | 310/216.118 |
| 6,498,417 | B2 * | 12/2002 | Fuller | H02K 1/185 | 310/431 |
| 6,589,018 | B2 * | 7/2003 | Chen | F04D 29/263 | 310/71 |
| 6,713,930 | B2 * | 3/2004 | Shah | H02K 1/185 | 310/216.076 |
| 6,720,699 | B1 * | 4/2004 | Shah | H02K 1/16 | 310/182 |
| 6,737,775 | B2 * | 5/2004 | Hatz | H02K 7/1815 | 322/4 |
| 6,796,021 | B2 * | 9/2004 | Fuller | H02K 15/00 | 310/91 |
| 6,856,064 | B2 * | 2/2005 | Masumoto | H02K 15/021 | 310/216.008 |
| 6,866,487 | B2 * | 3/2005 | Abe | F04C 18/0215 | 417/410.5 |
| 6,933,640 | B2 * | 8/2005 | Schurter | H02K 1/185 | 310/85 |
| 6,960,861 | B2 * | 11/2005 | Yoneda | H02K 1/148 | 310/216.012 |
| 6,979,930 | B2 * | 12/2005 | Harada | H02K 15/021 | 310/216.004 |
| 7,397,163 | B2 * | 7/2008 | Cook | H02K 1/187 | 310/427 |
| 7,471,000 | B1 * | 12/2008 | Ruiz | H02J 7/1415 | 320/105 |
| 7,560,838 | B2 * | 7/2009 | van der Woude | F02C 7/32 | 310/64 |
| 7,583,001 | B2 * | 9/2009 | Lu | H02K 1/2791 | 310/67 R |
| 7,653,986 | B2 * | 2/2010 | Majernik | H02K 15/028 | 29/598 |
| 7,687,952 | B2 * | 3/2010 | York | H02K 1/28 | 310/263 |
| 7,687,954 | B2 * | 3/2010 | Neet | H02K 19/24 | 310/263 |
| 7,827,668 | B2 * | 11/2010 | McKee | E21B 17/20 | 29/515 |
| 7,847,444 | B2 * | 12/2010 | Kingman | H02K 5/203 | 310/91 |
| 7,868,509 | B2 * | 1/2011 | Yoshino | H02K 1/16 | 310/216.131 |
| 7,919,898 | B2 * | 4/2011 | Wang | H02K 1/276 | 310/216.127 |
| 7,928,617 | B2 * | 4/2011 | Tsukashima | H02K 7/20 | 310/51 |
| 8,138,649 | B2 * | 3/2012 | Bradfield | H02K 21/044 | 310/156.19 |
| 8,450,898 | B2 * | 5/2013 | Sears | H02K 3/522 | 310/194 |
| 8,587,165 | B2 * | 11/2013 | Zahora | H02K 9/06 | 310/58 |
| 8,643,246 | B2 * | 2/2014 | Allen | H02K 1/18 | 310/216.029 |
| 8,829,743 | B2 * | 9/2014 | Watanabe | H02K 9/19 | 310/60 A |
| 8,941,282 | B2 * | 1/2015 | Allen | H02K 1/18 | 310/216.049 |
| 9,136,746 | B2 * | 9/2015 | Ikuta | H02K 15/066 | |
| 9,263,921 | B2 * | 2/2016 | Tanavde | H02K 3/46 | |
| 9,287,741 | B2 * | 3/2016 | Nobata | H02K 15/14 | |
| 9,496,765 | B2 * | 11/2016 | Zheng | H02K 1/185 | |
| 9,509,182 | B2 * | 11/2016 | Yamarthi | H02K 1/185 | |
| 10,075,047 | B2 * | 9/2018 | Zhou | H02K 1/185 | |
| 10,177,631 | B1 * | 1/2019 | Hopkins | H02K 5/15 | |
| 10,393,082 | B2 * | 8/2019 | Ihde | F02N 11/0803 | |
| 10,483,817 | B2 * | 11/2019 | Sakurai | H02K 1/28 | |
| 10,530,213 | B2 * | 1/2020 | Kitamura | H02K 15/12 | |
| 10,840,773 | B2 * | 11/2020 | Takano | H02K 9/227 | |
| 10,907,627 | B2 * | 2/2021 | Ihde | F04B 17/03 | |
| 11,286,956 | B2 * | 3/2022 | Kajikawa | H02K 7/14 | |
| 2001/0038797 | A1 * | 11/2001 | Makino | H02K 7/14 | 417/410.3 |
| 2003/0184182 | A1 * | 10/2003 | Smith, Jr. | H02K 15/022 | 310/216.084 |
| 2003/0214197 | A1 * | 11/2003 | De Luca | H02K 1/148 | 310/216.084 |

(56) References Cited

U.S. PATENT DOCUMENTS

2004/0217669 A1* 11/2004 Fujii ...................... H02K 1/148 310/216.045
2005/0034295 A1* 2/2005 Meacham ................ H02K 1/02 29/598
2006/0004887 A1* 1/2006 Schenk ..................... G06F 8/30
2006/0071574 A1* 4/2006 Stewart .................. H02K 1/146 310/216.132
2009/0289522 A1* 11/2009 Buban .................... H02K 1/148 310/216.113
2010/0021321 A1* 1/2010 Koike ................... F04C 23/008 310/216.136
2010/0135830 A1* 6/2010 Yasuda .................. H02K 1/146 310/216.069
2010/0264757 A1* 10/2010 Asou ........................ H02K 3/38 310/43
2010/0308687 A1* 12/2010 George .................. H02K 1/185 310/216.135
2011/0121680 A1* 5/2011 Boardman, IV ....... H02K 1/185 310/216.129
2012/0153749 A1* 6/2012 Chun ..................... H02K 5/207 310/59
2013/0089428 A1* 4/2013 Hottier ...................... F01D 5/00 416/223 R
2013/0106252 A1* 5/2013 Yanagida ............. H02K 11/225 310/68 B
2013/0140939 A1* 6/2013 Asaga .................... H02K 15/02 29/598
2013/0187517 A1* 7/2013 Asao ........................ H02K 5/04 310/68 D
2013/0313922 A1* 11/2013 Kim ....................... H02K 3/522 310/44
2014/0183984 A1* 7/2014 Kobayashi ............... H02K 3/00 310/43
2014/0197715 A1* 7/2014 Roopnarine ............. H02K 9/02 310/216.106
2014/0231483 A1* 8/2014 Takaichi ................... B26F 3/00 225/105
2014/0265683 A1* 9/2014 Hossain ................. H02K 1/185 310/89
2014/0354107 A1* 12/2014 Alfermann ............. H02K 15/14 310/216.113
2014/0360334 A1* 12/2014 Singer-Schnoeller ....................... B23B 31/11 29/428
2015/0000114 A1* 1/2015 Matsushita ........... H02K 15/03 29/729
2015/0022051 A1* 1/2015 Meng ................. B29C 45/0001 524/514
2015/0069865 A1* 3/2015 Alfermann ............... H02K 9/19 310/54
2015/0143691 A1* 5/2015 Takaichi ................ H02K 15/03 29/738
2015/0222151 A1* 8/2015 Semken ................... H02K 1/28 29/452
2016/0079817 A1* 3/2016 Hayashi ................... H02K 1/22 29/598
2016/0087493 A1* 3/2016 Kanakamedala ........ H02K 1/18 310/216.129
2016/0285324 A1* 9/2016 Carrasco ................ H02K 1/185
2016/0285342 A1* 9/2016 Carrasco .................. H02K 7/09
2017/0182587 A1* 6/2017 Tokoro ................. B23K 20/123
2017/0201135 A1* 7/2017 Kai .......................... H02K 3/18
2017/0313283 A1* 11/2017 Kojima .................. H02K 1/146
2018/0043420 A1* 2/2018 Handwerker ........ B21K 25/005
2018/0248439 A1* 8/2018 McGrew, Jr. .......... H02K 1/185
2018/0351435 A1* 12/2018 Takano .................. H02K 9/223
2022/0239181 A1* 7/2022 Morgen ................... H02K 5/16
2024/0413677 A1* 12/2024 Takahashi .............. H02K 1/185
2025/0030282 A1* 1/2025 Koch ..................... H02K 1/146
2025/0219480 A1* 7/2025 Takahashi ................ H02K 5/15

* cited by examiner

MOTOR WITH POSITIONING COMPONENT AND ELECTRICAL PRODUCT THEREOF

CROSS REFERENCE TO RELATED APPLICATIONS

The present invention claims priority under 35 U.S.C. § 119 to Chinese Application No. 202320158581.6 filed on Jan. 31, 2023, the entire content of which is incorporated herein by reference.

FIELD OF THE DISCLOSURE

This disclosure relates to an electromechanical field, in particular to a motor and an electrical product.

BACKGROUND

For existing brake motors, when a motor is assembled, first it is necessary to position each component before assembling them. For example, when a housing and a stator are assembled, the housing and the stator need to be positioned respectively. When the housing is positioned, generally a concave component that is recessed toward the inside of the housing is defined on the bottom of the housing, and then positioning pins are inserted into the concave component from the bottom of the housing, thereby positioning the housing. As for the stator, the stator generally needs to be positioned by an external device and then pressed into the housing. Thereafter, the housing and stator are assembled.

It should be noted that the above description of the technical background is only for the convenience of clearly and completely describing the technical solutions of the present disclosure, and for facilitating the understanding of those skilled in the art. It should not be assumed that the above-mentioned technical solutions are commonly known to those skilled in the art simply because these solutions are described in the background section of the present disclosure.

The inventor found that: when using the existing method for positioning and assembling the housing and the stator, since the adhesive has not yet cured after the stator is pressed into the housing, the position of the stator relative to the housing is likely to shift again, thereby resulting in poor positioning accuracy. On the other hand, since the positioning concave component is defined at the bottom of the housing, the axial distance between the bottom of the housing and the stator core is greater than the axial dimension of the concave component. Therefore, the axial dimension of the motor is large.

SUMMARY

In an aspect of the embodiments of the present disclosure, there is provided a motor, which includes a stator and a housing for accommodating the stator. The housing includes a housing wall and a housing bottom, the stator includes a stator core and a resin component at least covering one side of the stator core facing the housing bottom, and one side of the resin component facing the housing bottom has a concave component. One side of the housing bottom facing the resin component has a positioning component, and the positioning component is axially opposite to the concave component.

In some embodiments, the positioning component is a through hole, and the through hole passes through the housing bottom.

In some embodiments, the distance between the stator and the housing bottom is less than or equal to 0.5 mm.

In some embodiments, one side of the concave component facing the through hole is a substantially chamfered structure; an opening diameter of the chamfered structure is larger than a diameter of the through hole.

In some embodiments, the diameter of at least a part of the other component of the concave component is equal to the diameter of the through hole.

In some embodiments, the periphery of the through hole on the axially lower surface of the housing bottom is a substantially annular structure that is recessed relative to other parts of the axially lower surface of the housing bottom.

In some embodiments, the surface smoothness of the annular structure is greater than the surface smoothness of other parts of the axially lower surface of the housing bottom.

In some embodiments, the housing wall and the housing bottom are integrally defined.

In some embodiments, the stator further includes a metal component disposed on the stator core. The resin component wraps the metal component, and the metal component is not exposed from the concave component; the concave depth of the concave component is less than or equal to 0.5 mm.

In another aspect of the embodiments of the present disclosure, an electrical product is provided, and the electrical product includes the motor described in any one of the foregoing embodiments.

The above and other elements, features, steps, characteristics and advantages of the present disclosure will become more apparent from the following detailed description of the preferred embodiments with reference to the attached drawings.

Features described and/or illustrated with respect to one embodiment may be used in the same or similar manner in one or more other embodiments, in combination with, or instead of features in other embodiments.

It should be emphasized that the term "comprises/includes/has" when used herein refers to the presence of a feature, integer, or component, but does not exclude the presence or addition of one or more other features, integers or components.

BRIEF DESCRIPTION OF THE DRAWINGS

Elements and features described in one drawing or one embodiment of an embodiment of the present disclosure may be combined with elements and features shown in one or more other drawings or embodiments. Furthermore, in the drawings, like numerals indicate corresponding parts in the several figures and may be used to indicate corresponding parts used in more than one embodiment. Also, the drawings are not drawn to scale and are merely intended to illustrate various embodiments of the present disclosure.

The included drawings are used to provide a further understanding of the embodiments of the present disclosure, which constitute a part of the specification, are used to illustrate the implementation of the present disclosure, and explain the principle of the present disclosure together with the text description. Clearly, the drawings in the following description are only some embodiments of the present disclosure, and those skilled in the art may obtain other drawings according to these drawings without any creative effort. In the attached figures.

DESCRIPTION OF THE EMBODIMENTS

Figure 1:
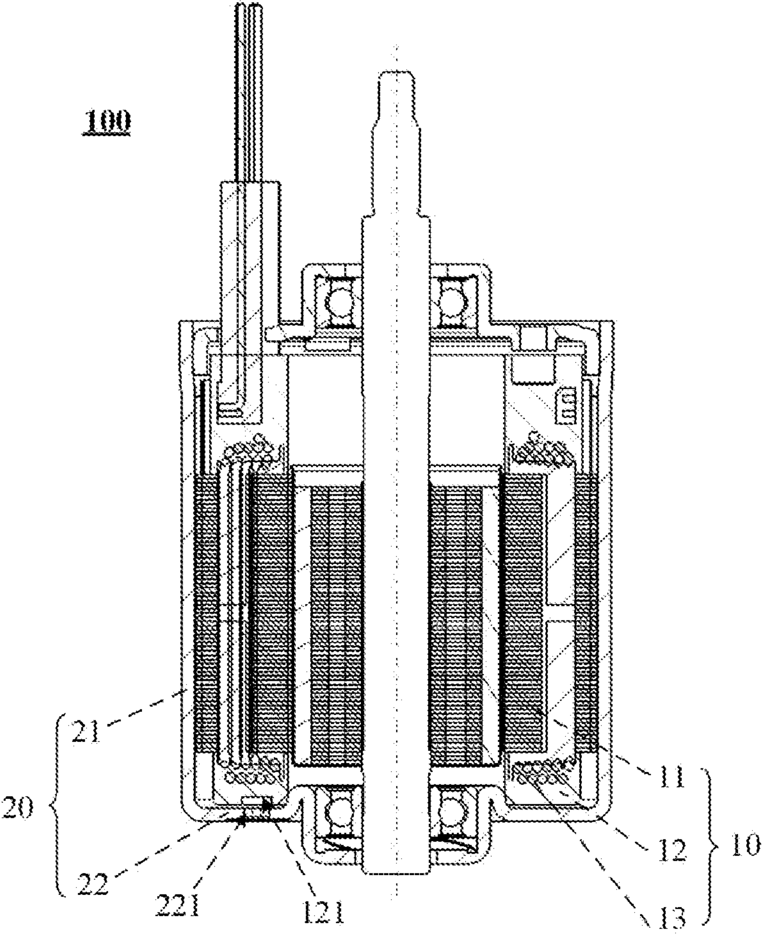
FIG. 1 is a sectional diagram of a motor of an exemplary embodiment of the present disclosure.

The foregoing and other features of the present disclosure will become clear from the following description with reference to the accompanying drawings. In the specification and drawings, exemplary embodiments of the disclosure are disclosed in detail, showing some embodiments in which the principles of the disclosure may be employed. It may be understood that the disclosure is not limited to the described embodiments, but rather the disclosure includes all modifications, variations and equivalents falling within the scope of the appended claims.

In the exemplary embodiments of the disclosure, the terms "first", "second", "upper", "lower", etc. are used to distinguish different elements from the title, but do not indicate the spatial arrangement or temporal order of these elements, etc., these elements should not be limited by these terms. The term "and/or" includes any and all combinations of one or more of the associated listed items. The terms "comprising", "including", "having" and the like refer to the presence of stated features, elements, elements or components, but do not exclude the presence or addition of one or more other features, elements, units or components.

In exemplary embodiments of the present disclosure, the singular forms "a", "the", etc. include plural forms, and should be broadly understood as "one kind of" or "one type of" rather than being limited to the meaning of "one". In addition, the term "the" is understood to include both the singular and the plural meanings, unless the context clearly dictates otherwise. Furthermore, the term "according to" should be understood as "at least in part according to . . . " and the term "based on" should be understood as "based at least in part on . . . " unless the context clearly dictates otherwise.

Furthermore, in the following description of the present disclosure, for ease of description, a direction that extends along the central axis of the motor or parallel to its direction is referred to as "axial direction", a radial direction using the central axis as the center is referred to as "radial direction", and a direction surrounding the central axis is referred to as "circumferential direction". A side away from the central axis in the radial direction is referred to as "radially outer side", and a side closer to the central axis in the radial direction is referred to as "radially inner side". The direction from the opening of the motor housing to the housing bottom of the motor in the axial direction is referred to as "the other side in the axial direction" or "the axially lower side" or "lower side" or "below", and the direction from the housing bottom of the motor to the opening of the motor housing in the axial direction is referred to us "one side in the axial direction" or "axially upper side" or "upper side" or "above". However, it is worth noting that the above terms are just for the convenience of description, and do not limit the orientation of the motor during use and manufacture.

Embodiments of the present disclosure will be described below in conjunction with the accompanying drawings.

An exemplary embodiment of the present disclosure provides a motor. FIG. 1 is a sectional diagram of a motor according to an embodiment of the present disclosure.

As shown in FIG. 1, the motor 100 of the embodiment of the present disclosure includes a stator 10 and a housing 20 for accommodating the stator 10. The housing 20 includes a housing wall 21 and a housing bottom 22, and the stator 10 includes a stator core 11 and a resin component 12 at least covering one side of the stator core 11 facing the housing bottom 22 (i.e., the axially lower side of the stator core 11).

In an exemplary embodiment of the present disclosure, as shown in FIG. 1, one side of the resin component 12 facing the housing bottom 22 (the axially lower side of the resin component 12) is provided with a concave component 121, one side of the housing bottom 22 facing the resin component 12 (the axially upper side of the housing bottom 22) is provided with a positioning component, and the positioning component is opposite to the concave component 121 in the axial direction.

In the above exemplary embodiment, the positioning of the motor during assembly is simplified by providing a concave component axially opposite to the positioning component of the housing bottom on one side of the resin component facing the housing bottom.

In some exemplary embodiments, as shown in FIG. 1, the positioning component is a through hole 221 (also referred to as a positioning hole), and the through hole 221 runs through the housing bottom 22.

Figure 2:
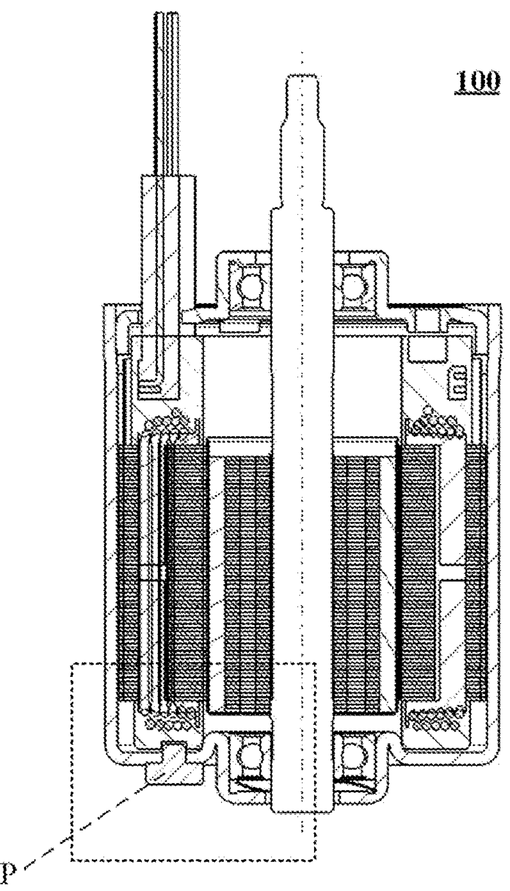
FIG. 2 is another sectional diagram of a motor of an exemplary embodiment of the present disclosure.
Figure 3:
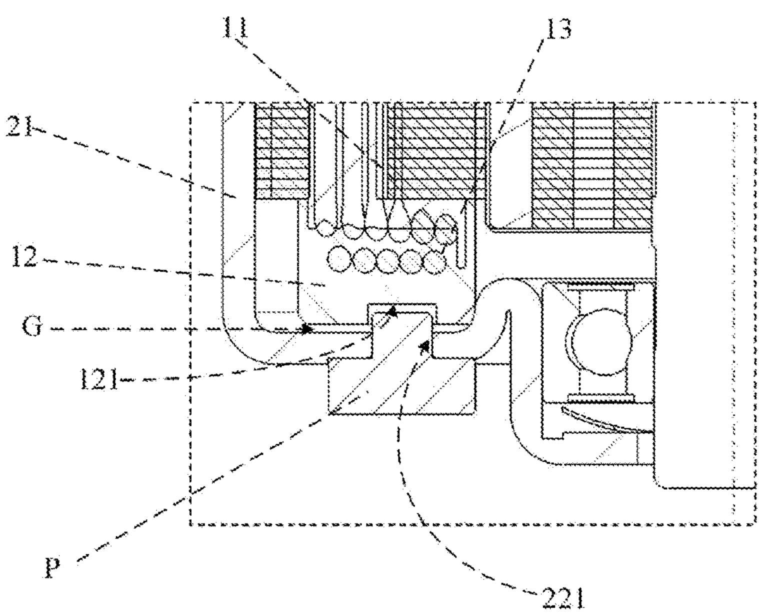
FIG. 3 is a partially enlarged schematic diagram of a dotted frame in FIG. 2.

FIG. 2 is another sectional diagram of a motor of an exemplary embodiment of the present disclosure, and FIG. 3 is a partially enlarged schematic diagram of a dotted line frame in FIG. 2. FIG. 2 and FIG. 3 show the condition where the positioning pin P is inserted into the through hole 221 as the positioning component and extends to the concave component 121.

In the above-mentioned exemplary embodiment, the positioning hole is adopted to replace the conventional positioning concave component of the housing bottom of the motor, and the concave component is defined in a part of the resin component of the stator core that is axially opposite to the positioning hole, and the positioning pin is inserted into the positioning hole and the concave component to position the housing and the stator core. In this way, even in the curing process, the stator will not be shifted. Moreover, since the housing does not have an axial distance for positioning the concave component, the axial distance between the housing bottom of the motor and the stator core is directly reduced, thereby reducing the axial dimension of the motor.

In some exemplary embodiments, as shown in FIG. 3, a gap G is defined between the stator 10 and the housing bottom 22. For example, the distance between the stator 10 and the housing bottom 22 (the axial height of the aforementioned gap G) is less than or equal to 0.5 mm. The distance between the stator 10 and the housing bottom 22 is the axial distance between the position closest to the housing bottom 22 of the stator 10 and the housing bottom 22, for example, in FIG. 3, the distance refers to the minimum axial height of the gap G between the resin component 12 of the stator 10 and the housing bottom 22.

In this way, the distance between the stator and the housing bottom is reduced, thereby reducing the axial dimension of the motor.

Figure 4:
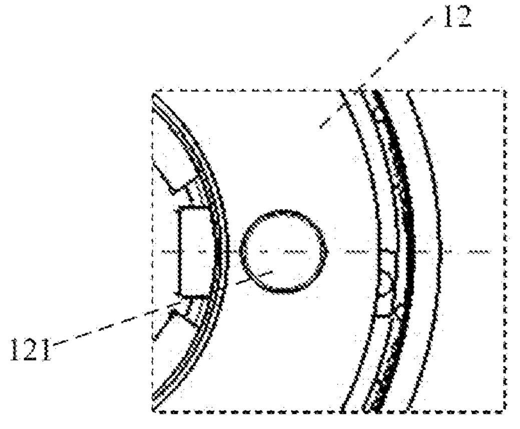
FIG. 4 is a partial schematic diagram of a motor of an exemplary embodiment of the present disclosure.
Figure 5:
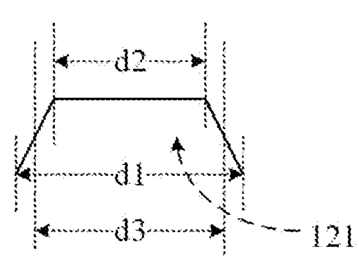
FIG. 5 is a schematic diagram of a concave component of a resin component of a stator of a motor according to an exemplary embodiment of the present disclosure.

FIG. 4 is a partial schematic diagram of a motor of an exemplary embodiment of the present disclosure, showing the resin component 12 viewed from the axially lower side to the axially upper side, that is, the axially lower surface of the resin component 12 is observed. As shown in FIG. 4, a concave component 121 is defined on the axially lower surface of the resin component 12. FIG. 5 is a schematic diagram of the concave component 121, showing the situation of observing the concave component 121 along the radial direction (that is, the direction pointing to the paper as shown in FIG. 1 and FIG. 2).

In some exemplary embodiments, as shown in FIG. 5, one side of the concave component 121 facing the through hole 221 (that is, the axially lower side) is a chamfered structure, and the opening diameter d1 of the chamfered structure is larger than that of the through hole 221. That is to say, the concave component 121 is defined as an inverted bowl structure, and viewed in the radial direction, the closer to the through hole 221 (the axially lower side, that is, the lower side in FIG. 5), the larger the diameter of the concave component 121. Therefore, in the process of positioning and assembling, since the positioning pin P needs to be inserted into the through hole 221 and extend into the concave component 121, it is convenient to position the housing and the stator.

In some exemplary embodiments, the diameter of at least a part of other components of the concave component 121 is equal to the diameter of the through hole 221. For example, as shown in FIG. 5, the diameter d2 of the bottom of the concave component 121 is equal to the diameter of the through hole 221, or the diameter d3 of a certain position on the wall of the concave component 121 is equal to the diameter of the through hole 221, and so on. As a result, when the positioning pin P is inserted into the through hole 221 and protrudes into the concave component 121, it is possible to prevent the stator core 11 from shacking and achieve reliable positioning.

Figure 6:
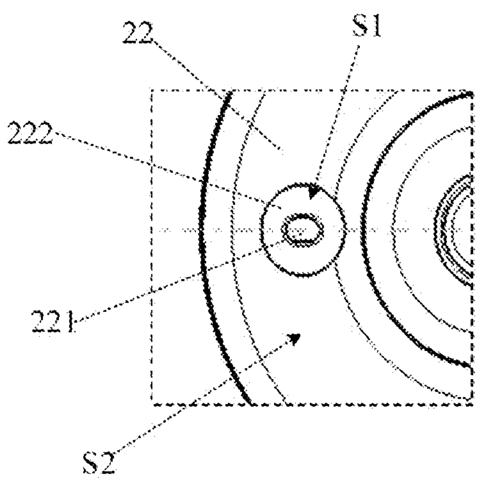
FIG. 6 is another partial schematic diagram of a motor of an exemplary embodiment of the present disclosure.

FIG. 6 is another partial schematic diagram of a motor of an exemplary embodiment of the present disclosure, showing the situation of viewing the housing bottom 22 from the axially lower side to the axially upper side, that is, the axially lower surface of the housing bottom 22 is observed.

In some exemplary embodiments, as shown in FIG. 6, the periphery of the through hole 221 on the axially lower surface of the housing bottom 22 is an annular structure 222 that is recessed relative to other parts of the axially lower surface of the housing bottom 22. That is, the circumference of the through hole 221 on the axially lower surface of the housing bottom 22 is recessed relative to the axially lower surface of the housing bottom 22, so that the positioning pin P may abut against the recess for a circle, thereby facilitating the positioning of the positioning pin P.

In the above exemplary embodiment, as shown in FIG. 6, the surface smoothness of the annular structure 222 is able to be greater than the surface smoothness of other parts of the axially lower surface of the housing bottom 22. For example, a smoothing treatment is able to be performed on the annular structure 222, so that the surface S1 of the annular structure 222 is smoother than the surface S2 of other parts of the axially lower surface of the housing bottom 22, so that the positioning of the positioning pin P is more accurate. The disclosure provides no limitation to the specific smoothing method.

In some exemplary embodiments, as shown in FIG. 1 and FIG. 2, the housing wall 21 and the housing bottom 22 are integrally defined. Therefore, due to the integral molding, the housing bottom 22 and the housing wall 21 will not be displaced relative to each other, thus further improving the reliability of positioning.

In some exemplary embodiments, as shown in FIG. 1 and FIG. 3, the stator 10 further includes a metal component 13 disposed on the stator core 11, the metal component 13 is, for example, a coil wound on the stator core 11, and the resin component 12 wraps the metal component 13, and the metal component 13 is not exposed from the concave component 121, thereby ensuring insulation.

In the above exemplary embodiments, there is no limit to the concave depth of the concave component 121, as long as the metal component 13 is not exposed from the concave component 121, for example, the concave depth of the concave component is able to be less than or equal to 0.5 mm, and so on.

The above only describes the structure related to the motor of the embodiment of the present disclosure. The motor may also have other components or structures, such as rotors, bearings, interface components, etc. For details, reference may be made to related technologies, and detailed descriptions are omitted here.

In an exemplary embodiment of the present disclosure, the motor 100 may be various types of motors, such as an EPS (Electric Power Steering) motor, a brake motor, and the like.

In an exemplary embodiment of the present disclosure, the positioning of the motor during assembly is simplified by providing a concave component axially opposite to the positioning component of the housing bottom on one side of the resin component facing the housing bottom. In addition, a positioning hole is adopted to replace the conventional positioning concave component of the housing bottom of the motor, and a concave component is defined in the resin component of the stator core that is axially opposite to the positioning hole, and the positioning pin is inserted into the positioning hole and the concave component to position the housing and the stator core. In this way, even in the curing process, the stator will not be shifted. Moreover, since the housing does not have an axial distance for positioning the concave component, the axial distance between the housing bottom of the motor and the stator core is directly reduced, thereby reducing the axial dimension of the motor.

An exemplary embodiment of the present disclosure provides an electrical product, which includes the motor 100 described in the embodiment of the first aspect. Since the structure of the motor 100 has been described in detail in the embodiment of the first aspect, its content is incorporated herein, and the detailed description is omitted here.

In the implementation of the present disclosure, the electrical product may be any electrical device provided with a motor, such as an electric power steering system and a brake system of an automobile.

The present disclosure has been described above in conjunction with specific implementation manners, but those skilled in the art should be clear that these descriptions are exemplary rather than limiting the protection scope of the present disclosure. Those skilled in the art may make various variations and modifications to this disclosure according to the spirit and principle of this disclosure, and these variations and modifications are also within the scope of this disclosure.

The embodiments of the present disclosure have been described in detail above with reference to the accompanying drawings, indicating how the principle of the present disclosure may be adopted. However, it should be understood that the implementation of the present disclosure is not limited to the manner of the above-mentioned embodiments, but also includes all changes, modifications and equivalents that do not depart from the spirit and scope of the present disclosure.

Features of the above-described preferred embodiments and the modifications thereof is able to be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, which comprises a stator and a housing for accommodating the stator, wherein the housing comprises a housing wall and a housing bottom, the stator comprises a stator core and a resin component at least covering one side of the stator core facing the housing bottom, one side of the resin component facing the housing bottom has a concave component;

one side of the housing bottom facing the resin component has a positioning component, and the positioning component is axially opposite to the concave component, wherein the positioning component is a through hole, and the through hole passes through the housing bottom, a periphery of the through hole on a axially lower surface of the housing bottom is an annular structure that is recessed relative to other parts of the axially lower surface of the housing bottom, and a surface smoothness of the annular structure is greater than a surface smoothness of the other parts of the axially lower surface of the housing bottom.

2. The motor according to claim 1, wherein, a distance between the stator and the housing bottom is less than or equal to 0.5 mm.

3. The motor according to claim 1, wherein the housing wall and the housing bottom are integrally defined.

4. The motor according to claim 1, wherein, the stator further comprises a metal component disposed on the stator core, the resin component wraps the metal component, and the metal component is not exposed from the concave component;

a concave depth of the concave component is less than or equal to 0.5 mm.

5. An electrical product, comprising the motor according to claim 1.

6. The motor according to claim 1, wherein, one side of the concave component facing the through hole is a chamfered structure;

an opening diameter of the chamfered structure is larger than a diameter of the through hole.

7. The motor according to claim 6, wherein, a diameter of at least a part of other components of the concave component is equal to the diameter of the through hole.

* * * * *